United States Patent [19]

Tiede

[11] Patent Number: 4,714,149
[45] Date of Patent: Dec. 22, 1987

[54] SELF PROPELLED AUGER AND SEPARABLE VEHICLE THEREFOR

[76] Inventor: Edward Tiede, 1360 Elm Street, Kelowna, British Columbia, Canada, V1Y 3W6

[21] Appl. No.: 917,198

[22] Filed: Oct. 9, 1986

[51] Int. Cl.$^4$ .............................................. B65G 21/10
[52] U.S. Cl. .................... 198/312; 280/767; 198/316.1
[58] Field of Search ............... 198/312, 315, 318, 302, 198/316; 280/80 A, 88, 472, 767; 180/12, 11, 905, 906, 209; 406/53

[56] References Cited

U.S. PATENT DOCUMENTS

| 1,310,187 | 7/1919 | Hodgson | 198/318 |
|---|---|---|---|
| 2,185,842 | 2/1940 | Flogaus | 180/54 |
| 2,427,324 | 9/1947 | Farr et al. | 198/318 |
| 2,667,472 | 8/1952 | Senstock | 198/312 |
| 2,813,618 | 11/1957 | Liston | 198/316 |
| 2,844,240 | 7/1958 | Buck | 198/316 |
| 2,912,095 | 11/1959 | Palmer et al. | 198/316 |
| 3,132,740 | 5/1964 | Myers | 198/312 |
| 3,184,045 | 5/1965 | Fry | 198/233 |
| 3,746,365 | 7/1973 | Kirschbaum | 280/767 |
| 3,853,333 | 12/1974 | Sancho et al. | 280/767 |
| 3,980,150 | 9/1976 | Gigli | 280/767 |
| 4,512,687 | 4/1985 | Enns | 198/318 |
| 4,513,837 | 4/1985 | Archer | 280/43.23 |
| 4,526,265 | 7/1985 | Enns | 198/318 |

Primary Examiner—James T. McCall
Attorney, Agent, or Firm—Adrian D. Battison; Stanley G. Ade

[57] ABSTRACT

A vehicle for attachment to a conventional auger to render the auger self-propelled comprises a frame having front driven steering wheels and rearwardly extending sleeve members into which stub shafts attach to the axle of the auger can project to integrate the axle of the auger and the vehicle. The vehicle includes liftable rear ground wheels which can allow it to be separately maneuverable and can be raised to allow the wheels of the auger to act as the rear wheels of the vehicle. The vehicle can be formed into a utility truck by the attachment of a truck portion having ground wheels into the sleeves in place of the stub shafts, with the auger removed.

19 Claims, 4 Drawing Figures

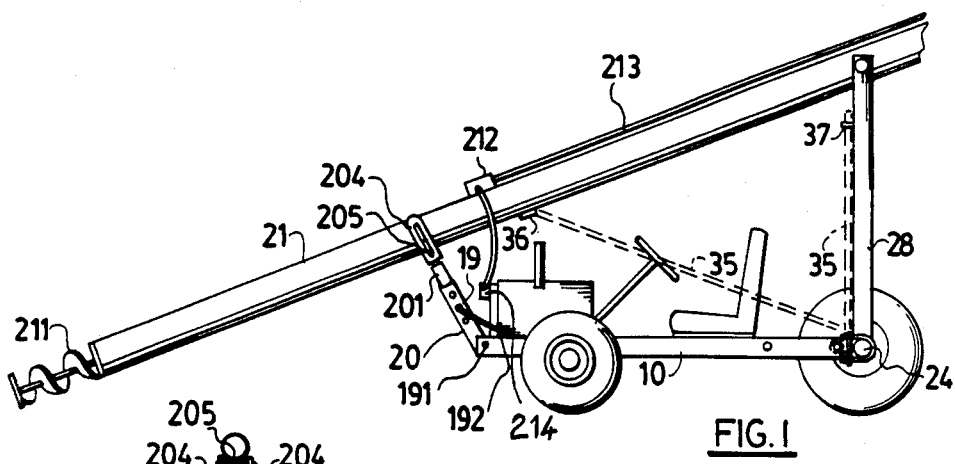
FIG.1
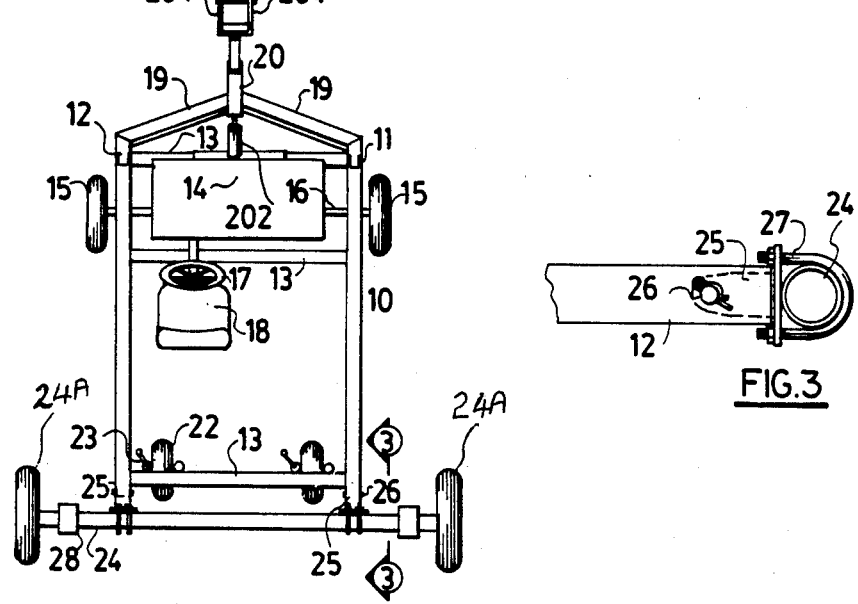
FIG.2
FIG.3
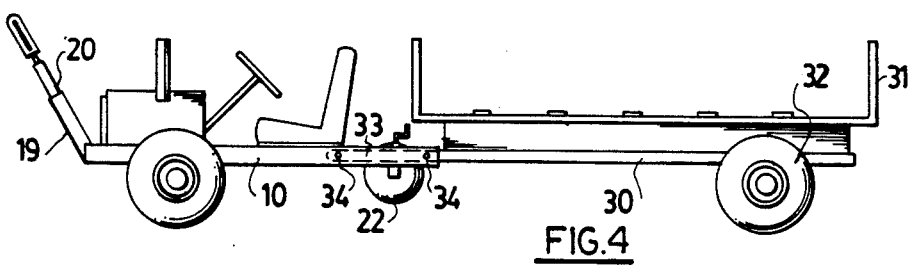
FIG.4

SELF PROPELLED AUGER AND SEPARABLE VEHICLE THEREFOR

This invention relates to a self-propelled auger and particularly to a separable vehicle which can be attached to an auger to render the auger self-propelled.

Many augers are in existence which are arranged for a simple manual manipulation and are mounted upon an axle and ground wheels with a pair of struts extending upwardly therefrom and a pair of stabilizer bars extending from the axle to a point on the auger tube spaced from the struts. The height of the auger relative to the ground can be altered by adjustment to the struts in some cases by moving the struts along a slide on the auger so that as their position on the auger changes, the angle of the auger to the ground also changes.

In one arrangement which has become common in recent years, an auger can be attached at its lower end to a rear hitch of a tractor and is driven from the PTO shaft of the tractor. This enables the auger to be moved from place to place simply and without the difficulty and danger of manual manipulation. However, this causes the lower end of the auger to be raised from the ground and unavailable for collection of the material and hence a smaller auger part must be coupled to the lower end of the auger and pivotal relative thereto so as to lift the material from the ground to a transfer box at the lower end of the auger.

In other arrangements for example shown in U.S. Pat. Nos. 4,526,265 and 4,512,687 (both to Silvanus T. Enns) a tractor is arranged along side a conventional auger with struts extending outwardly to the side of the auger for attachment to the tractor. This arrangement does not interfere with the lower end of the auger being used for directly collecting the material but it forms an unwieldy and wide construction which is difficult to manoeuver.

It is one object of the present invention, therefore, to provide an auger arrangement which is effectively self-propelled in that it does not require a separate conventional tractor for attachment to the auger.

It is also an object of the present invention to provide a vehicle which can be attached to a conventional auger to render it self-propelled so that the vehicle can be used with already existing augers and can be simply attached thereto.

According to a first aspect of the invention, therefore, there is provided a vehicle for propelling an auger of the type comprising elongate auger tube, an axle having ground wheels thereon and strut means for supporting the auger above the axle, the vehicle comprising frame, a pair of ground wheels on the frame for supporting one end of the vehicle, means on the frame at an opposed end of the vehicle for releasably coupling the frame to the axle whereby the frame can be supported on said pair of ground wheels and on the axle such that when attached the frame is supported on the pair of ground wheels and on the axle, an engine on the frame, drive transmission means for transmitting drive from said engine to said pair of ground wheels and steering means for steering movement of said pair of ground wheels.

According to a second aspect of the invention there is provided a self-propelled auger comprising an auger tube, a frame having a first and second pair of ground wheels, an engine on said frame, drive transmission means for driving one of said pairs of wheels from said engine, steering means for steering one of said pairs of wheels, a pair of strut means at one end of the frame for supporting the auger directly thereabove longitudinally therealong and parallel to the direction of motion of the wheels thereof and means mounted on the other end of said frame and adjustable relative thereto for supporting the auger thereabove and for adjusting the angle of the auger tube relative to said frame and to the horizontal.

The invention therefore provides a simple, inexpensive vehicle constituted simply by the frame, engine and front wheel drive transmission to the pair of wheels with the rear wheels of the vehicle being constituted by the axle and ground wheels of the auger.

This arrangement provides a vehicle which is narrower than the auger itself and can therefore be simply maneuvered even into very limited areas.

The vehicle can therefore be fitted onto a conventional auger in place of the two conventional stabilizer bars which are removed. The auger can be driven by a hydraulic motor powered by the vehicle if required.

The attachment of the vehicle to the axle of the auger can be simply achieved by stub shafts which are mounted upon the axle as an additional feature, the stub shafts being inserted into sleeves formed by the open ends of the frame members. The vehicle can be simply separated from the auger axle and attached to a different auger which carries a separate set of the stub shafts. In the case where the second auger is of the larger size, adjustment pieces can be attached to the frame to adjust the distance between the axle and the front wheels.

Preferably the frame includes a pair of additional ground wheels which can be lowered into contact with the ground to allow the vehicle to be moved only to be separated from the axle. The additional wheels can then of course be jacked out of contact with the ground when the vehicle is attached to the axle. In addition a light utility truck arrangement can be provided which can be attached to the frame in place of the axle so that the truck and frame constitute a single vehicle.

The invention will become more apparent from the accompanying drawings.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view partly in cross-section of a self-propelled auger including a separable vehicle.

FIG. 2 is a top plan view of the self-propelled auger of FIG. 1 with the auger tube removed.

FIG. 3 is a cross-sectional view of the attachment of the frame to the axle of the auger of FIG. 1.

FIG. 4 is a side elevational view of a light utility truck including the vehicle of FIG. 1 with the auger removed.

In the drawings like characters of reference indicate corresponding parts in the different figures.

DETAILED DESCRIPTION

A self-propelled unit for attachment to the grain auger to render the grain auger self-propelled is shown basically in FIGS. 1 and 2. The unit comprises a generally rectangular main-frame 10 having a pair of elongate parallel side rails 11 and 12 and a number of transverse struts 13 thus forming a rigid chassis or frame. On the frame is mounted an engine 14 on suitable support struts (not shown) which includes a conventional drive transmission for driving front wheels 15 through drive shafts indicated schematically at 16.

A steering mechanism 17 again of conventional construction includes a steering wheel and steering linkage (not shown) communicating steering movement to the wheels 15. The steering wheel can be moved by a driver seated in a seat 18 mounted on the frame and facing forwardly relative to the front wheels 15. Suitable controls including gear shift mechanism, engine velocity controls and the like are of course also provided but are not shown for convenience of illustration.

A forward end of the frame carries a pair of upwardly and inwardly inclined struts 19 which converge to an apex centrally of the frame. At the apex is mounted a sleeve or tube 20 inclined to the horizontal at the angle of the struts 19 and extending upwardly therefrom. Inside the sleeve 20 is mounted a sliding tube 201 which can move longitudinally of the sleeve under control of a hydraulic cylinder 202. An upper end of the tube 201 carries a slide support for the auger tube constituted by an inwardly facing pair of channel irons 204 which act as runners for rollers 205 carried on the auger tube. The struts 19 are pivotally mounted on a forward end 191 of the frame and braced at a required inclined angle by braces 192 which are adjustable relative to the struts 19. This adjustment allows the vehicle to accommodate augers of different lengths. The auger includes an auger tube 21 and flight 211 of conventional form.

A rear end of the frame carries on one of the transverse struts 13 a pair of small ground wheels 22 which are fixed in direction relative to the frame parallel to the side rails so as to act, when lowered to the ground, for supporting a rear end of the frame and acting as rear wheels of the vehicle when the vehicle is separated from the auger. It will be appreciated that axle 24 and ground 24A form part of the auger at and hence, when the vehicle is separated from the auger, the small ground wheels 22 act alone to support the rear end of the vehicle. A lifting mechanism is schematically indicated at 23 for raising the ground wheels 22 relative to the frame so they can be lifted from the ground when the rear end of the frame is otherwise supported by the axle 24 or by other wheels as shown for example in FIG. 4. The lifting mechanism may be of a manual nature including hand operated cranks (not shown) or can be hydraulic for simple automatic actuation by a switch positioned adjacent the driver's seat.

A rearmost end of the frame comprises a pair of projecting portions of the side rails 11 and 12. The side rails are formed from tubular metal so as to define sleeves having a rear opening each of which can receive a stub shaft in sliding fit to latch the rear end of the frame to the stub shaft.

An axle the axle of the auger 21, which forms part of the auger, is indicated at 24 and of the auger 21 is indicated at 24 and is of conventional construction. The axle comprises a rigid elongate member upon which is rotatably mounted at respective ends one of a pair of ground wheels. A forward or upper end of the auger is supported relative to the axle on a pair of upright struts 28 which are mounted on the axle and extend upwardly therefrom to an engagement with the auger tube.

As is well known the height of the upper end of the auger can generally be adjusted by movement of the struts 28 along the auger tube on a slide mechanism. This slide actuation can be achieved by a winch and cable arrangement or by hydraulic cylinder as is conventionally known. The vehicle therefore may include hydraulic actuation mechanism for causing actuation of the slide of the struts 28 relative to the auger tube. For convenience of illustration the particular type of actuation mechanism is not shown as this is of a conventional nature.

The auger is driven by a hydraulic motor 212 and drive shaft 213 powered by a pump 214 attached to the engine on the frame. Quick release couplings allow immediate disconnection of the hydraulic lines from the motor 212.

The width of the frame defined by the rails 11 and 12 is less than the width of the axle 24. In practice the width of the axle can be of the order of 6 to 10 feet and thus the width of the frame will be of the order of 4 to 5 feet so it can accommodate various different auger axle widths.

The frame is attached to the axle by way of a pair of stub shafts 25 which constitute separate items which can be clamped to the axle 24 as best shown in the detail of FIG. 3. Thus the stub shafts carry hoop shaped clamps 27 which can be wrapped around the axle 24 to rigidly clamp the stub shaft to the axle. The stub shafts can therefore be slid into the exposed open end of the rails 11 and 12 and located therein by a transverse pin 26 which passes through the rail 11 or 12 and through the respective stub shaft 25.

As pivot movement between the frame and the legs 28 is required to accommodate different angles therebetween, this can be provided by the pivot coupling between the legs 28 and the axle 24 if this is present on the auger concerned or it can be provided by mounting the stub shafts on the axle such that they can rotate relative to the axle about the axis of the axle.

With the rear end of the frame attached to the axle 24, the ground wheels 22 can be lifted by actuation of the mechanism 23 so that the ground wheels of the auger act as the rear wheels of the vehicle and render the auger and vehicle system as a self-propelled unit. The whole unit can therefore be driven from place to place and maneuvered into its required angular orientation simply by actuation of the various mechanisms on the vehicle itself by the driver on the seat 18.

The frame 10 can be separated from the axle 24 by initially lowering the wheels 22 to the ground and then by removing the stub shafts 25 from the rails 11 and 12. In order to support the auger separately from the vehicle, a pair of braces 35 are provided which are pivotally coupled to the axle 24 at a lower end and which can extend therefroem to a latch member 36 on the auger tube at a position lower than the coupling to struts 28. The braces 35 are telescopic so that they can be collapsed and stored in latched position as indicated at 37 against the struts 28 when the vehicle is attached to the axle. When the vehicle is removed, the braces can immediately be lowered and extended to be attached to the latch member 36 to brace the auger in its upright position.

The height of the auger when attached can be adjusted by activating the mechanism (not shown) associated with the legs 28. With the lower end resting on the ground, the rollers 205 slide along the slide support 204 to take up a position dependent upon the angle of the auger tube. The cylinder 202 can then be activated to take up the movement of the rollers and if required to raise the lower end.

Turning now to FIG. 4, the separated unit can be driven away from the auger as a separate vehicle and can be attached to a truck unit as shown. The truck unit comprises a frame 30 which provides a pair of side rails extending forwardly for engaging the sleeves defined by the rails 11 and 12 as indicated at 33, in place of the stub shaft 25, and latched in place by the pins 34. The frame 30 carries a hopper 31 of conventional construction which may or may not be pivotal and is mounted on ground wheels 32. Thus when the stub shaft 33 has been inserted into the sleeves defined by the rails 11 and 12, the small ground wheels 22 can be lifted so the vehicle is supported on four ground wheels defined by the wheels 32 and the steering drive wheels 15.

In an alternative arrangement (not shown) vehicle 10 can be attached to a larger auger by the provision of an extension portion having a stub shaft which can extend into the sleeve defined by the rails 11 and 12 and a receptor portion for engaging the stub shafts 25. Thus the front wheels 15 are spaced further from the axle 24 of the larger auger so that the hydraulic cylinder 20 has a better mechanical advantage and so that the wheel base is increased to improve stability. In this way the vehicle can be used for both larger size augers and for smaller augers simply by the removal or attachment of the extension pieces.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle for propelling an auger, said auger including an elongate auger tube, an axle having ground wheels thereon and strut means for supporting the auger above the axle, said vehicle comprising a frame having one end and an an end opposed thereto, a pair of ground wheels on the frame for supporting said one end of the vehicle, means on the frame at said opposed end of the vehicle adapted for releasably coupling the frame to the axle of the auger whereby the frame can be supported on said pair of ground wheels and on said axle of said auger such that when attached the frame is supported on the pair of ground wheels and on the axle, an engine on the frame, drive transmission means for transmitting drive from said engine to said engine to said pair of ground wheels and steering means for steering movement of said pair of ground wheels.

2. The invention according to claim 1 wherein the frame includes a pair of parallel spaced chassis members arranged to extend outwardly from said opposed end of the frame for engagement with the axle.

3. The invention according to claim 2 wherein said vehicle includes a pair of stub shaft members arranged for attachment to the axle and means on said frame for releasable coupling to said stub shaft members.

4. The invention according to claim 3 wherein said coupling means comprises sleeve members each having an opening projecting outwardly from said opposed end for receiving therein said stub shafts and pin means for extending traversely of said sleeve members so as to locate said stub shafts therein.

5. The invention according to claim 1 including means for supporting said auger tube at said one end of said vehicle.

6. The invention according to claim 5 including adjustable means for varying the height of support of said auger tube at said one end.

7. The invention according to claim 6 wherein said means comprises start means slideable within a sleeve, a hydraulic cylinder for activating said sliding movement and a coupling between said start means and said auger allowing free movement along the coupling along the coupling parallel to the start.

8. The invention according to claim 1 wherein said strut means of said auger is arranged for adjustment of the height of the auger from said opposed end and wherein said vehicle includes means for actuating said adjustment means.

9. The invention according to claim 1 including a seat and steering mechanism arranged so that said pair of wheels constitute the front wheels of the vehicle.

10. The invention according to claim 1 including ground wheel means for supporting said opposed end of said frame when said frame is separated from said axle, said ground wheel means being liftable so as to be clear of the ground when said frame is attached to said axle.

11. The invention according to claim 1 including a truck member having a pair of ground wheels and coupling means for cooperating with said coupling means of said frame whereby, with said axle separated from said frame, said truck member can be attached thereto so that the vehicle and truck member constitute a separately mobile vehicle.

12. A self-propelled auger comprising an auger tube, a frame having a first and second pair of ground wheel, an engine on said frame, drive transmission means for driving one of said pairs of wheels from said engine, steering means for steering one of said pairs of wheels, a pair of strut means at one end of the frame for supporting the auger directly thereabove longitudinally therealong and parallel to the direction of motion of the wheels thereof and means mounted on the other end of said frame and adjustable relative thereto for supporting the auger thereabove and for adjusting the angle of the auger tube relative to said frame and to the horizontal.

13. The invention according to claim 1 wherein a pair of said wheels include a transverse axle and wherein the frame includes a pair of parallel spaced chassis members arranged to extend outwardly from said opposed end of the frame for engagement with the axle.

14. The invention according to claim 3 wherein said vehicle includes a pair of stub shaft members arranged for attachment to the axle and means on said frame for releasable coupling to said stub shaft members.

15. The invention according to claim 14 wherein said coupling means comprises sleeve members each having an opening projecting outwardly from said opposed end for receiving therein said stub shafts and pin means for extending traversely of said sleeve members so as to locate said stub shafts therein.

16. The invention according to claim 13 wherein said strut means of said auger is arranged for adjustment of the height of the auger from said opposed end and wherein said vehicle includes means for actuating said adjustment means.

17. The invention according to claim 13 including a seat and steering mechanism arranged so that the pair of wheels at said opposed end of said frame constitute the front wheels of the vehicle.

18. The invention according to claim 14 including ground wheel means for supporting said opposed end of said frame when said frame is separated from said axle, said ground wheel means being liftable so as to be clear of the ground when said frame is attached to said axle.

19. The invention according to claim 14 including a truck member having a pair of ground wheels and coupling means for cooperating with said coupling means of said frame whereby, with said axle separated from said frame, said truck member can be attached thereto so that the vehicle and truck member constitute a separately mobile vehicle.

* * * * *